(12) United States Patent
Aluru et al.

(10) Patent No.: US 11,377,023 B2
(45) Date of Patent: Jul. 5, 2022

(54) PROACTIVE HEADLIGHT TRACKING FOR VEHICLE AUTO HIGH BEAM ASSIST

(71) Applicant: GM GLOBAL TECHNOLOGY OPERATIONS LLC, Detroit, MI (US)

(72) Inventors: Sai Vishnu Aluru, Commerce, MI (US); Joshua Inglese, South Lyon, MI (US); Taylor A. Jakubczak, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 17/031,016

(22) Filed: Sep. 24, 2020

(65) Prior Publication Data

US 2022/0089084 A1 Mar. 24, 2022

(51) Int. Cl.
*B60Q 1/14* (2006.01)
*B60R 11/04* (2006.01)
*B60Q 1/08* (2006.01)

(52) U.S. Cl.
CPC ............ *B60Q 1/1423* (2013.01); *B60Q 1/08* (2013.01); *B60R 11/04* (2013.01); *B60Q 2300/42* (2013.01); *B60R 2300/30* (2013.01)

(58) Field of Classification Search
None
See application file for complete search history.

(56) References Cited

U.S. PATENT DOCUMENTS

| | | | |
|---|---|---|---|
| 2005/0152581 A1* | 7/2005 | Hoki | B60Q 1/143 382/104 |
| 2010/0102990 A1* | 4/2010 | Kamioka | G06V 10/758 348/E5.022 |
| 2014/0029803 A1* | 1/2014 | Hammarstrom | G06V 20/584 382/104 |
| 2020/0001777 A1* | 1/2020 | Hiroi | B60Q 1/143 |

\* cited by examiner

*Primary Examiner* — Rebecca A Volentine
(74) *Attorney, Agent, or Firm* — Lorenz & Kopf LLP (57) ABSTRACT

In exemplary embodiments, methods and systems are provided for controlling an auto high beam functionality for headlights of a vehicle. In an exemplary embodiment, a method includes: obtaining camera data pertaining to an object in front of the vehicle; identifying, via a processor, a radial gradient of pixels in a region of interest from the camera data; and automatically controlling, via the processor, the auto high beam functionality for the headlights based on the radial gradient.

11 Claims, 4 Drawing Sheets

PROACTIVE HEADLIGHT TRACKING FOR VEHICLE AUTO HIGH BEAM ASSIST

INTRODUCTION

The technical field generally relates to the field of vehicles and, more specifically, to controlling auto high beam functionality in vehicles.

Many vehicles today have headlights with automatic high beam functionality, for example in which the vehicle headlights' high beams are automatically controlled under various circumstances. In such vehicles, the high beams may be turned off when an approaching vehicle is detected. However, in certain situations, existing headlight auto high beam control systems may not always be optimally controlled, for example, when driving on a roadway with a hill or other incline.

Accordingly, it is desirable to provide improved systems and methods for controlling auto high beam functionality for vehicle headlights. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided for controlling an auto high beam functionality for headlights of a vehicle, the method including: obtaining camera data pertaining to an object in front of the vehicle; identifying, via a processor, a radial gradient of pixels in a region of interest from the camera data; and automatically controlling, via the processor, the auto high beam functionality for the headlights based on the radial gradient.

Also in an exemplary embodiment, the method further includes: calculating, via the processor, a size of the radial gradient from the camera data; wherein the automatically controlling includes automatically controlling, via the processor, the auto high beam functionality for the headlights based on the size of the radial gradient.

Also in an exemplary embodiment, the calculating of the size of the radial gradient includes calculating, via the processor, a number of pixels in the radial gradient from the camera data; and the automatically controlling includes automatically reducing, via the processor, an intensity of the headlights when the number of pixels in the radial gradient exceeds a predetermined threshold.

Also in an exemplary embodiment, the method further includes: calculating, via the processor, a density of the radial gradient from the camera data; wherein the automatically controlling includes automatically controlling, via the processor, the auto high beam functionality for the headlights based on the density of the radial gradient.

Also in an exemplary embodiment, the calculating of the density of the radial gradient includes calculating, via the processor, a difference between a maximum shade and a minimum shade in the radial gradient from the camera data; and the automatically controlling includes automatically reducing, via the processor, an intensity of the headlights if the difference between the maximum shade and the minimum shade in the radial gradient exceeds a predetermined threshold.

Also in an exemplary embodiment, the method further includes: calculating, via the processor, a size of the radial gradient from the camera data; and calculating, via the processor, a density of the radial gradient from the camera data; wherein the automatically controlling includes automatically controlling, via the processor, the auto high beam functionality for the headlights based on both the size and the density of the radial gradient.

Also in an exemplary embodiment, the calculating of the size of the radial gradient includes calculating, via the processor, a number of pixels in the radial gradient from the camera data; the calculating of the density of the radial gradient includes calculating, via the processor, a difference between a maximum shade and a minimum shade in the radial gradient from the camera data; and the automatically controlling includes automatically reducing, via the processor, an intensity of the headlights based on both the number of pixels and the difference between the maximum shade and the minimum shade in the radial gradient from the camera data.

In another exemplary embodiment, a system for controlling an auto high beam functionality for headlights of a vehicle, the system including: a camera configured to provide camera data pertaining to an object in front of the vehicle; and a processor coupled to the camera and configured to at least facilitate: identifying a radial gradient of pixels in a region of interest from the camera data; and automatically controlling the auto high beam functionality for the headlights based on the radial gradient.

Also in an exemplary embodiment, the processor is further configured to at least facilitate: calculating a size of the radial gradient from the camera data; and automatically controlling the auto high beam functionality for the headlights based on the size of the radial gradient.

Also in an exemplary embodiment, the processor is further configured to at least facilitate: calculating the size by calculating a number of pixels in the radial gradient from the camera data; and automatically reducing an intensity of the headlights when the number of pixels in the radial gradient exceeds a predetermined threshold.

Also in an exemplary embodiment, the processor is further configured to at least facilitate: calculating a density of the radial gradient from the camera data; and automatically controlling, via the processor, the auto high beam functionality for the headlights based on the density of the radial gradient.

Also in an exemplary embodiment, the processor is further configured to at least facilitate: calculating the density by calculating a difference between a maximum shade and a minimum shade in the radial gradient from the camera data; and automatically reducing an intensity of the headlights if the difference between the maximum shade and the minimum shade in the radial gradient exceeds a predetermined threshold.

Also in an exemplary embodiment, the processor is further configured to at least facilitate: calculating a size of the radial gradient from the camera data; calculating a density of the radial gradient from the camera data; and automatically controlling the auto high beam functionality for the headlights based on both the size and the density of the radial gradient.

Also in an exemplary embodiment, the processor is further configured to at least facilitate: calculating the size by calculating a number of pixels in the radial gradient from the camera data; calculating the density by calculating a difference between a maximum shade and a minimum shade in the radial gradient from the camera data; and automatically reducing, via the processor, an intensity of the headlights based on both the number of pixels and the difference between the maximum shade and the minimum shade in the radial gradient from the camera data.

In another exemplary embodiment, a vehicle is provided that includes: one or more headlights having an auto high beam functionality; and a control system for controlling the auto high beam functionality for the headlights, the control system including: a camera configured to provide camera data pertaining to an object in front of the vehicle; and a processor coupled to the camera and configured to at least facilitate: identifying a radial gradient of pixels in a region of interest from the camera data; and automatically controlling the auto high beam functionality for the headlights based on the radial gradient.

Also in an exemplary embodiment, the processor is further configured to at least facilitate: calculating a size of the radial gradient from the camera data; and automatically controlling the auto high beam functionality for the headlights based on the size of the radial gradient.

Also in an exemplary embodiment, the processor is further configured to at least facilitate: calculating the size by calculating a number of pixels in the radial gradient from the camera data; and automatically reducing an intensity of the headlights when the number of pixels in the radial gradient exceeds a predetermined threshold.

Also in an exemplary embodiment, wherein the processor is further configured to at least facilitate: calculating a density of the radial gradient from the camera data; and automatically controlling, via the processor, the auto high beam functionality for the headlights based on the density of the radial gradient.

Also in an exemplary embodiment, the processor is further configured to at least facilitate: calculating the density by calculating a difference between a maximum shade and a minimum shade in the radial gradient from the camera data; an automatically reducing an intensity of the headlights if the difference between the maximum shade and the minimum shade in the radial gradient exceeds a predetermined threshold Also in an exemplary embodiment, the processor is further configured to at least facilitate: calculating a size of the radial gradient from the camera data by calculating a number of pixels in the radial gradient from the camera data; calculating a density of the radial gradient from the camera data by calculating a difference between a maximum shade and a minimum shade in the radial gradient from the camera data; and automatically reducing, via the processor, an intensity of the headlights based on both the number of pixels and the difference between the maximum shade and the minimum shade in the radial gradient from the camera data.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
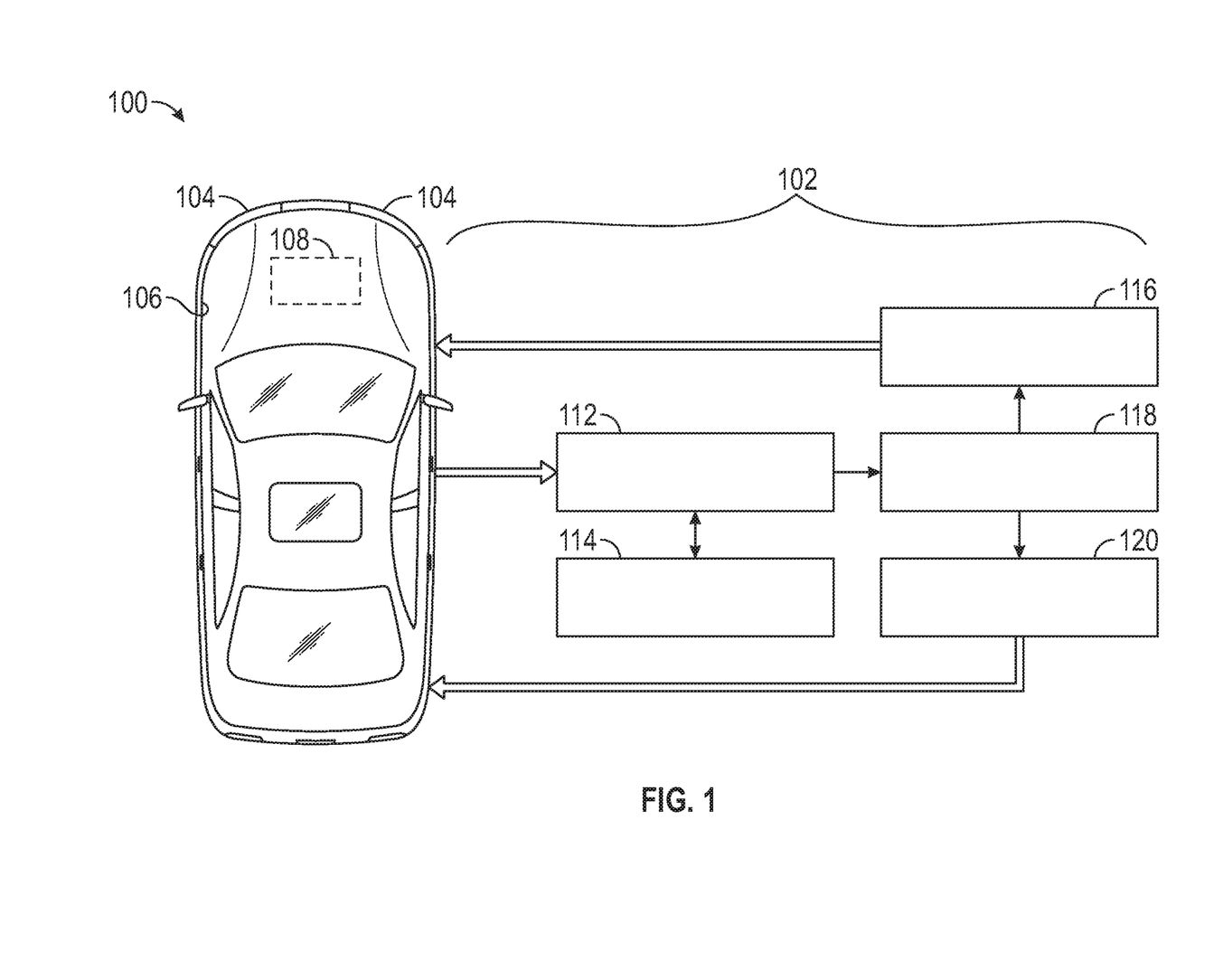
FIG. 1 is a functional block diagram of a vehicle that includes vehicle headlights and a control system that controls the headlights, including auto high beam functionality for the vehicle headlights, in accordance with exemplary embodiments.

FIG. 1 illustrates a vehicle 100, according to an exemplary embodiment. As described in greater detail further below, the vehicle 100 includes a control system 102 for controlling auto high beam functionality for headlights 104 of the vehicle 100. As described in greater detail further below, the control system 102 controls the high beam functionality of the headlights 104 based on a radial gradient in camera data with respect to a region of interest for an object in front of the vehicle 100, in accordance with exemplary embodiments.

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle and/or one or more other types of vehicles. In addition, in various embodiments, it will also be appreciated that the vehicle 100 may comprise any number of other types of mobile platforms.

In the depicted embodiment, the vehicle 100 includes a body 106 that substantially encloses other components of the vehicle 100. Also in the depicted embodiment, the vehicle 100 includes a plurality of axles and wheels (not depicted in FIG. 1) that facilitate movement of the vehicle 100 as part of or along with a drive system 108 of the vehicle 100.

In various embodiments, the drive system 108 comprises a propulsion system. In certain exemplary embodiments, the drive system 108 comprises an internal combustion engine and/or an electric motor/generator. In certain embodiments, the drive system 108 may vary, and/or two or more drive systems 108 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments the control system 102 includes one or more of the following: a vision system (FOM) 112, an instrument panel cluster (IPC) 116, a body control module (BCM) 118, and an exterior lighting module (ELM). In various embodiments, the vision system 112 obtains camera data for the vehicle 100, identifies and performs calculations with respect to a radial gradient with respect to a region of interest in the camera data that corresponds to an object in front of the vehicle 100 (including calculations as to a size and a density of the radial gradient), and provides instructions for controlling auto high beam functionality for the headlights 104 of the vehicle 100.

In various embodiments, the vision system 112 provides these features via machine vision and image processing 114 with respect to the camera data and the identified radial gradient therein. In addition, in various embodiments, the vision system 112 controls the auto high beam functionality for the headlights 104 via instructions that are provided from the vision system 112 through the body control module 118 and on to the exterior lighting module 120 that is coupled to the headlights 104. In various embodiments, these steps are set forth in greater detail further below in connection with the process 300 of FIG. 3 and the implementations of FIGS. 4 and 5.

Also in various embodiments, the body control module 118 also uses other data, calculations, and requirements for controlling the auto high beam functionality for the headlights 104 via instructions provided to the exterior lighting module 120, for example, using other data, such as vehicle speed as well as user inputs (e.g. user instructions and/or overrides) from the instrument panel cluster 116.

Figure 2:
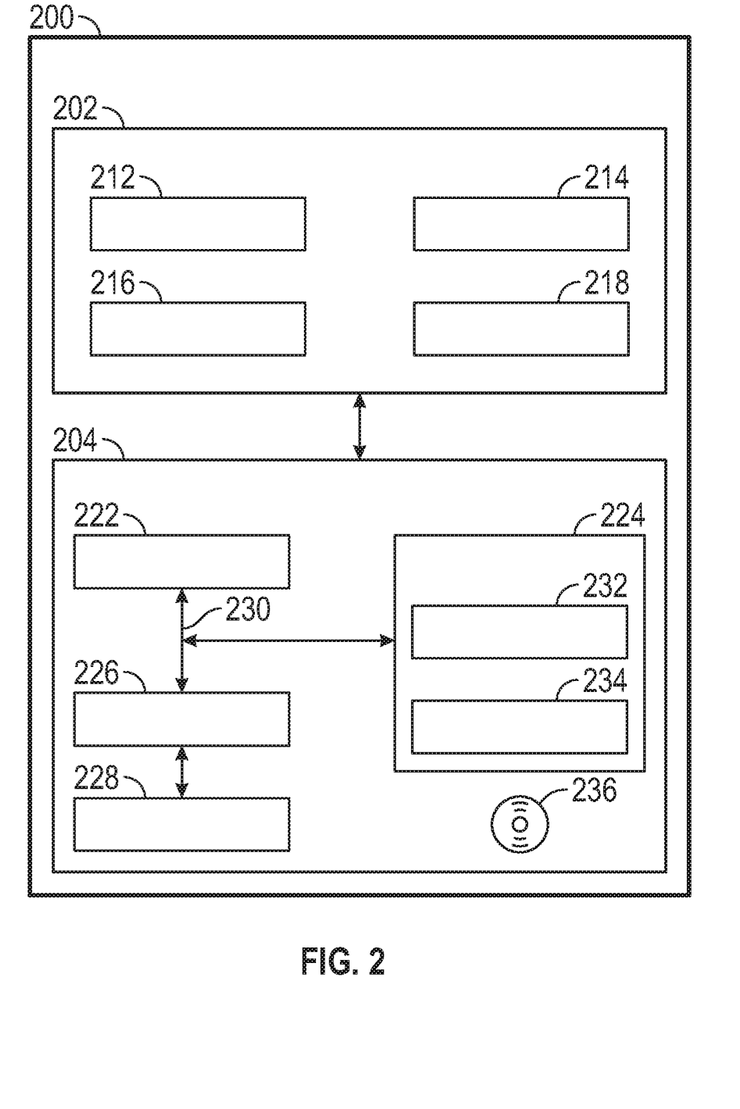
FIG. 2 is a functionality block diagram of a computer system of a control system for controlling headlights of a vehicle, including for controlling auto high beam functionality, and that can be implemented in connection with the control system of FIG. 1, in accordance with exemplary embodiments.

With respect to FIG. 2, a functional block diagram is provided for a control system 200 that controls auto high beam functionality for headlights for a vehicle, in accordance with exemplary embodiments. In various embodiments, the control system 200 corresponds to the control system 102 of the vehicle 100 of FIG. 1, and/or components thereof. In certain embodiments, the control system 200 and/or components thereof are part of the vision system 112 of FIG. 1. In certain embodiments, the control system 200 and/or components thereof may be part of and/or coupled to one or more of the vision system 112, instrument panel cluster 116, body control module 118, and/or exterior lighting module 120. In addition, while FIG. 2 depicts a control system 200 having a sensor array 202 (with a camera 212 and other sensors) and a computer system 204 (with a processor 222, a memory 224, and other components), and while the control system 200 in one embodiment corresponds at least in part with the vision system 112 of FIG. 1, it will be appreciated that in various embodiments each of the vision system 112, instrument cluster 116, body control module 118, and exterior lighting module 120 may include the same or similar components as set forth in FIG. 2 and/or as described below, for example including respective sensors and/or respective processors and memories, and so on.

As depicted in FIG. 2, in various embodiments, the control system 200 incudes a sensor array 202 and a controller 204. In various embodiments, the sensor array 202 includes one or more cameras 212. In various embodiments, one or more of the cameras 212 face in front of the vehicle 100, for example in order to detect objects on or near a roadway or path in front of the vehicle 100. Also in certain embodiments, the sensor array 202 may also include one or more other types of detection sensors 2014 (e.g., including, in some embodiments, RADAR, LiDAR, SONAR, or the like), one or more vehicle speed sensors 216 (e.g., wheel speed sensors, accelerometers, and/or other sensors for measuring data for determining a speed of the vehicle 100), and/or one or more other sensors 218 (e.g., in certain embodiments, user input sensors, GPS sensors, and so on).

Also as depicted in FIG. 2, the controller is coupled to the sensor array 202. In various embodiments, the controller 204 controls auto high beam functionality for the headlights of the vehicle, based on an identified radial grant from camera data from the camera 212 pertaining to one or more detected objects in front of the vehicle (e.g., along a path or roadway in front of the vehicle), for as set forth in greater detail further below in connection with the process 300 of FIG. 3 and the implementations of FIGS. 4 and 5. As depicted in FIG. 2, in various embodiments, the controller 204 comprises a computer system comprising a processor 222, a memory 224, an interface, a storage device 228, a bus 230, and a disk 236.

As depicted in FIG. 2, the controller 204 comprises a computer system. In certain embodiments, the controller 204 may also include the sensor array 202 and/or one or more other vehicle components. In addition, it will be appreciated that the controller 204 may otherwise differ from the embodiment depicted in FIG. 2. For example, the controller 204 may be coupled to or may otherwise utilize one or more remote computer systems and/or other control systems, for example as part of one or more of the above-identified vehicle devices and systems.

In the depicted embodiment, the computer system of the controller 204 includes a processor 222, a memory 224, an interface 226, a storage device 228, and a bus 230. The processor 222 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 222 executes one or more programs 232 contained within the memory 224 and, as such, controls the general operation of the controller 204 and the computer system of the controller 204, generally in executing the processes described herein, such as the process 300 discussed further below in connection with FIG. 2.

The memory 224 can be any type of suitable memory. For example, the memory 224 may include various types of dynamic random access memory (DRAM) such as SDRAM, the various types of static RAM (SRAM), and the various types of non-volatile memory (PROM, EPROM, and flash). In certain examples, the memory 224 is located on and/or co-located on the same computer chip as the processor 222. In the depicted embodiment, the memory 224 stores the above-referenced program 232 along with one or more stored values 234 (e.g., including, in various embodiments, predetermined threshold values for controlling the auto high beam functionality).

The bus 230 serves to transmit programs, data, status and other information or signals between the various components of the computer system of the controller 204. The interface 226 allows communications to the computer system of the controller 204, for example from a system driver and/or another computer system, and can be implemented using any suitable method and apparatus. In one embodiment, the interface 226 obtains the various data from the sensor array 202, the drive system 108, the suspension system 106, and/or one or more other components and/or systems of the vehicle 100. The interface 226 can include one or more network interfaces to communicate with other systems or components. The interface 226 may also include one or more network interfaces to communicate with technicians, and/or one or more storage interfaces to connect to storage apparatuses, such as the storage device 228.

The storage device 228 can be any suitable type of storage apparatus, including various different types of direct access storage and/or other memory devices. In one exemplary embodiment, the storage device 228 comprises a program product from which memory 224 can receive a program 232 that executes one or more embodiments of one or more processes of the present disclosure, such as the steps of the process 300 discussed further below in connection with FIG. 2. In another exemplary embodiment, the program product may be directly stored in and/or otherwise accessed by the memory 224 and/or one or more other disks 236 and/or other memory devices.

The bus 230 can be any suitable physical or logical means of connecting computer systems and components. This includes, but is not limited to, direct hard-wired connections, fiber optics, infrared and wireless bus technologies. During operation, the program 232 is stored in the memory 224 and executed by the processor 222.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 222) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
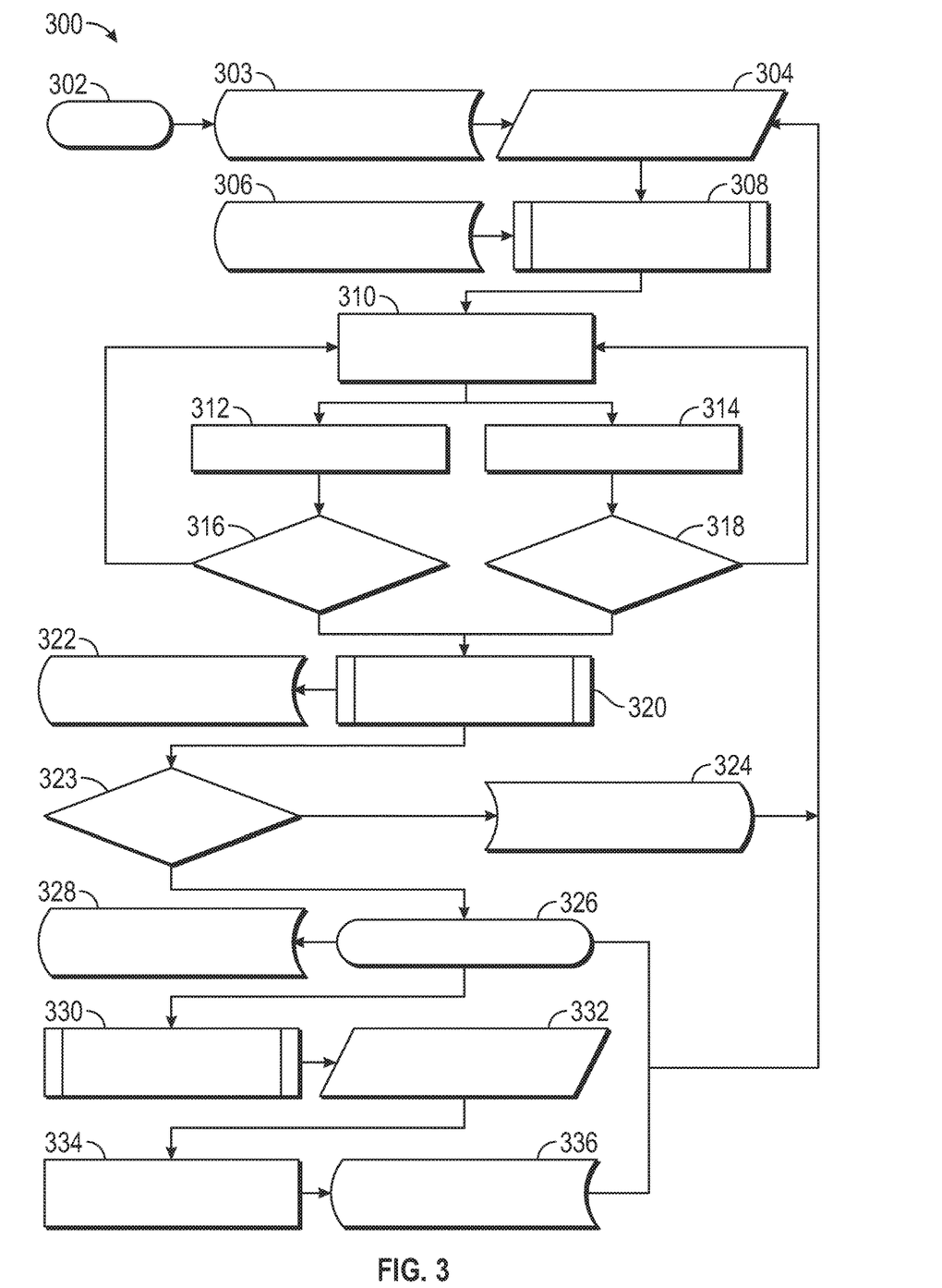
FIG. 3 is a flowchart of a process for controlling auto high beam functionality for headlights of a vehicle, and that can be implemented in connection with the vehicle of FIG. 1, the control system of FIG. 1, and the computer system of FIG. 2, in accordance with exemplary embodiments.

FIG. 3 is a flowchart of a process 300 for controlling high beam functionality for headlights of a vehicle, in accordance with exemplary embodiments. In various embodiments, the process 300 may be implemented in connection with the vehicle 100 of FIG. 1, including the control system 102 thereof, and including the control system 200 of FIG. 2 (and/or components thereof). The process 300 is also described further below in connection with FIGS. 4 and 5, which provide illustrative examples of an implementation of the process 300 of FIG. 3 in connection with the vehicle 100 of FIG. 1, as depicted on a roadway with other vehicles in front of the vehicle 100, in accordance with various exemplary embodiments.

As depicted in FIG. 3, in various embodiments the process 300 begins at 302. In various embodiments, the process 300 begins when one or more events occur to indicate that a vehicle drive is taking place or about to take place, such as a driver, operator, or passenger entering the vehicle 100, an engine or motor of the vehicle 100 being turned on, a transmission of the vehicle 100 being placed in a "drive" mode, or the like.

Sensor data is collected at 303. In various embodiments, camera data is obtained from the one or more cameras 212 of FIG. 2, including camera data with images of a path or roadway, and any detected objects therein or in proximity thereto, in front of the vehicle 100 (i.e., in the direction in which the vehicle 100 is travelling) In certain embodiments, additional sensor data may also be obtained from one or more other sensors of the sensor array 202 of FIG. 2, for example including other types of sensor data from other detection sensors 214 to identify objects in front of the vehicle 100 (e.g., using RADAR, LiDAR, SONAR, or the like) and/or vehicle speed (e.g., via one or more speed sensors 216 and/or other vehicle data.

In various embodiments, an image frame is obtained, at 304, from the camera data. In various embodiments, each image frame corresponds to camera data for regions in front of the vehicle 100 at a particular point in time.

Also in various embodiments, the horizontal field of view (HFOV) and vertical field of view (VFOV) are calibrated at 306 using the sensor data. In various embodiments, the HFOV and VFOV are calibrated by the processor 222 of FIG. 2 using the sensor data 303. Also in various embodiments, the region of interest (ROI) in 308 can only be precisely identified after the exact calibration of the HFOV and VFOV.

In various embodiments, a region of interest is identified at 308. In various embodiments, the region of interest (ROI) is identified by the processor 222 of FIG. 2 as a region of the frame from the camera data surrounding a detected object in front of the vehicle 100 (e.g., on or near a path or roadway in front of the vehicle 100), based on the horizontal and vertical field of view. In various embodiments, further processing is then confined to this particular region of the image frame.

A radial gradient is identified for the image frame at 310. In various embodiments, the processor 222 of FIG. 2 identifies a radial gradient within the region of interest of 308 as an area of transition through multiple levels of lightness to darkness (or vice versa) within the region of interest of the image frame. In various embodiments, the pixels of the region of interest are scanned via the processor 222 in order to identify a gradient.

Figure 4:
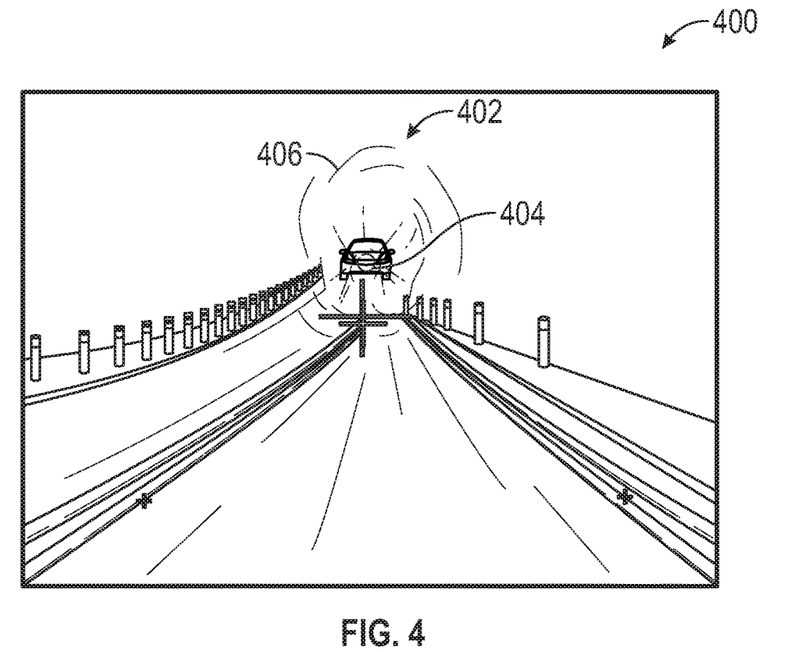
FIGS. 4 and 5 are schematic diagrams of an illustrative example of an implementation of the process of FIG. 3 in connection with the vehicle of FIG. 1, as depicted on a roadway along with one or more other vehicles, in accordance with various exemplary embodiments.

For example, with reference to FIG. 4, a first implementation is provided, showing a first image frame 400 including a detected object that is along a roadway in front of the vehicle 100 (not depicted in FIG. 4). As shown in FIG. 4, the first image frame 400 includes a radial gradient 402 surrounding headlights of the detected object (i.e., a detected oncoming vehicle). As shown in FIG. 4, in this example, the radial gradient 402 extends from a center 404 to an outer rim 406. Also as shown in FIG. 4, the radial gradient 402 exemplifies a transition between a lightest region in the center 404, a darkest region in the outer rim 406, and various different shades (e.g., different shades of grey) that are each incrementally darker from one another from the center 404 to the outer rim 406.

With reference back to FIG. 3, in various embodiments, a size of the radial gradient is calculated and monitored at 312. In various embodiments, the size of the radial gradient comprises a count of the number of pixels in the gradient, and/or in a component region therein. For example, in one embodiment, the size of the radial gradient comprises a count of pixels from the center 404 to a single outer corner of the outer rim 406 (e.g., corresponding to a radius of the radial gradient 402). By way of additional example, in certain other embodiments, the size of the radial gradient comprises a count of pixels throughout the entire surface of the outer rim 406 (e.g., corresponding to an area of the radial gradient 402).

Also in various embodiments, a density of the radial gradient is calculated and monitored at 314. In various embodiments, the density of the radial gradient comprises a difference between the minimum and maximum shades in the radial gradient.

In various embodiments, a determination is made at 316 as to whether the size of the radial gradient is greater than a predetermined threshold. In various embodiments, the processor 222 of FIG. 2 makes a determination as to whether the number of pixels in the radial gradient, as counted at 312, exceeds a predetermined threshold. In various embodiments, the threshold is also a calibratable look up table comprising of both radius counts and area counts. Also in various embodiments, if it is determined that the size of the radial gradient is greater than the predetermined threshold, then the process proceeds to step 320, described further below. Also in various embodiments, otherwise the process proceeds to the above-described step 310.

In various embodiments, a determination is made at 318 as to whether the density of the radial gradient is greater than a predetermined threshold. In various embodiments, the processor 222 of FIG. 2 makes a determination as to whether the difference between the minimum and maximum color shades of the pixels number of pixels in the radial gradient, as determined at 314, exceeds a predetermined threshold. In various embodiments, the density threshold is also a calibratable look up table comprising exponential/linear/logarithmic increase in the density counts. In various embodiments, if it is determined that the density of the radial gradient is greater than the predetermined threshold, then the process proceeds to step 320, described further below. Also in various embodiments, otherwise the process proceeds to the above-described step 310.

With respect to steps 316 and 318, in certain embodiments, the process proceeds to step 320 if both the size and the density of the radial gradient exceed their respective thresholds (and otherwise returns to step 310). In contrast, in certain other embodiments, the process proceeds to step 320 if either the size, or the density, or both, are greater than their respective predetermined thresholds (and otherwise returns to step 310).

During step 320, a gradient index is assigned. In various embodiments, the processor 222 of FIG. 2 assigns an index value representing a geographic location of the radial gradient. In addition, in certain embodiments, an intensity of the auto high beams for the headlights are reduced at 322, specifically by instructions provided by the processor 222 of FIG. 2 (e.g., as transmitted via the vision system 112 through the body control module 118 to the exterior lighting module 120 of FIG. 1). In addition, also in certain embodiments, the process proceeds to step 323, described below.

During step 322, a scan is performed of possible headlights within the radial gradient, and a determination is made as to whether headlights of another vehicle have been identified in the radial gradient. In certain embodiments, step 322 includes a determination made by the processor 222 of FIG. 2 as to whether a closer inspection of the camera data (i.e., in a future frame as the detected object comes closer to the vehicle 100) reveals that headlights of another vehicle are indeed represented by the radial gradient.

Figure 5:
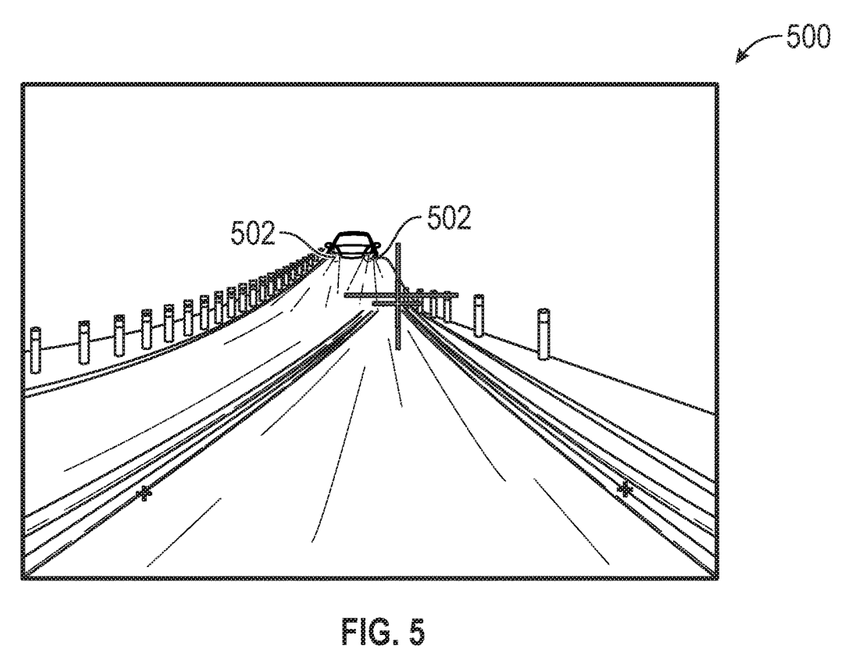

For example, with respect to FIG. 5, a second image frame 500 is provided, that is subsequent in time to the first image frame 400 of FIG. 4. As shown in FIG. 5, as the detected object comes closer to the vehicle 100 of FIG. 1, the subsequent (second) image frame 500 reveals that two headlights 502 are present from another vehicle 100 in the second image frame. In various embodiments, this serves as a confirmation of the initial determination (that was based on the radial gradient) that another vehicle is approaching the vehicle 100 of FIG. 1.

With reference back to FIG. 3, in various embodiments, if it is determined that headlights of another vehicle are not found as being represented within the radial gradient, then the auto high beam functionality is turned on (or turned back on) for the headlights 104 of the vehicle 100 at 324. In various embodiments, the process then returns to 304.

Conversely, in various embodiments, if it is determined that headlights of another vehicle are found as being represented within the radial gradient, then the process begins tracking the other vehicle at 326 (e.g., via instructions provided by the processor 222 to the sensor array 202 of FIG. 2), and the automatic high beams are turned off at 328 by instructions provided by the processor 222 of FIG. 2 (e.g., as transmitted via the vision system 112 through the body control module 118 to the exterior lighting module 120 of FIG. 1).

Also in various embodiments, a headlight index is assigned for the headlights of the other vehicle (e.g., pertaining to a geographic location thereof) at 330, and two dimensional coordinates calculated from image area are provided for the headlights of the other vehicle at 332, based on the physical vehicle's geographic location. In addition, in various embodiments, the two-dimensional coordinates are transformed to latitudinal and longitudinal values using intrinsic values at 334.

In certain embodiments, auto high beams are partially turned off at 336. For example, in certain embodiments, certain of the high beams that are facing toward the additional vehicle of FIG. 5 may be turned off at 336, whereas other high beams that are not facing toward the additional vehicle of FIG. 5 may remain on high beam mode at 336. In various embodiments, such instructions are provided via the processor 222 of FIG. 2 (e.g., as transmitted via the vision system 112 through the body control module 118 to the exterior lighting module 120 of FIG. 1). Also in certain embodiments, tracking of the additional vehicle continues in various iterations of step 326 until the additional vehicle is no longer present in the camera data image frames, after which the process returns to step 304 with respect to the detection of a new object.

Accordingly, methods, systems, and vehicles are provided for controlling auto (or automatic) high beam functionality for headlights of vehicles. In various embodiments, camera data is utilized to detect and examine a radial gradient in the camera images from headlights of a detected vehicle that is in front of the vehicle 100 of FIG. 1, for use in controlling the auto high beam functionality. In various embodiments, the auto high beams are reduced or turned off when the radial gradient indicates that another vehicle is present in front of the vehicle 100, to thereby reduce glare for the other vehicle. By using the radial gradient, the disclosed processes, systems, and vehicles can potentially provide earlier detection of an approaching vehicle, particularly in situations in which there is a hill and/or sloped road, thereby further minimizing glare for the driver of the approaching vehicle.

It will be appreciated that the systems, vehicles, applications, and implementations may vary from those depicted in the Figures and described herein. For example, in various embodiments, the vehicle 100, the control system 102, components thereof, and/or other components may differ from those depicted in FIG. 1 and/or described above in connection therewith. It will also be appreciated that components of the control system 200 of FIG. 2 may differ in various embodiments. It will further be appreciated that the steps of the process 300 may differ, and/or that various steps thereof may be performed simultaneously and/or in a different order, than those depicted in FIG. 3 and/or described above. It will also be appreciated that implementations of the process 300 may differ from those depicted in FIGS. 4 and/or 5 and/or as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for controlling an auto high beam functionality for headlights of a vehicle, the method comprising:
   obtaining camera data pertaining to an object in front of the vehicle;
   identifying, via a processor, a radial gradient of pixels in a region of interest from the camera data;
   calculating, via the processor, a density of the radial gradient from the camera data by calculating a difference between a maximum shade and a minimum shade in the radial gradient from the camera data; and
   automatically controlling, via the processor, the auto high beam functionality for the headlights based on the density of the radial gradient, by automatically reducing an intensity of the headlights if the difference between the maximum shade and the minimum shade in the radial gradient exceeds a predetermined threshold.

2. The method of claim 1, further comprising:
   calculating, via the processor, a size of the radial gradient from the camera data;
   wherein the automatically controlling further comprises automatically controlling, via the processor, the auto high beam functionality for the headlights based on the size of the radial gradient.

3. The method of claim 2, wherein:
   the calculating of the size of the radial gradient comprises calculating, via the processor, a number of pixels in the radial gradient from the camera data; and
   the automatically controlling further comprises automatically reducing, via the processor, an intensity of the headlights when the number of pixels in the radial gradient exceeds a predetermined threshold.

4. The method of claim 1, further comprising:
   calculating, via the processor, a size of the radial gradient from the camera data;
   wherein the automatically controlling further comprises automatically controlling, via the processor, the auto high beam functionality for the headlights based on both the size and the density of the radial gradient.

5. The method of claim 4, wherein:
   the calculating of the size of the radial gradient comprises calculating, via the processor, a number of pixels in the radial gradient from the camera data; and
   the automatically controlling further comprises automatically reducing, via the processor, the intensity of the headlights based on both the number of pixels and the difference between the maximum shade and the minimum shade in the radial gradient from the camera data.

6. A system for controlling an auto high beam functionality for headlights of a vehicle, the system comprising:
   a camera configured to provide camera data pertaining to an object in front of the vehicle; and
   a processor coupled to the camera and configured to at least facilitate:
   identifying a radial gradient of pixels in a region of interest from the camera data;
   calculating a size of the radial gradient by calculating a number of pixels in the radial gradient from the camera data;
   calculating a density of the radial gradient by calculating a difference between a maximum shade and a minimum shade in the radial gradient from the camera data; and
   automatically controlling the auto high beam functionality for the headlights based on the radial gradient, based on both the size and the density of the radial gradient, by automatically reducing an intensity of the headlights based on both the number of pixels and the difference between the maximum shade and the minimum shade in the radial gradient from the camera data.

7. The system of claim 6, wherein the processor is further configured to at least facilitate:
   automatically reducing the intensity of the headlights when the number of pixels in the radial gradient exceeds a predetermined threshold.

8. The system of claim 6, wherein the processor is further configured to at least facilitate:
   automatically reducing the intensity of the headlights if the difference between the maximum shade and the minimum shade in the radial gradient exceeds a predetermined threshold.

9. A vehicle comprising:
   one or more headlights having an auto high beam functionality; and
   a control system for controlling the auto high beam functionality for the headlights, the control system comprising:
   a camera configured to provide camera data pertaining to an object in front of the vehicle; and
   a processor coupled to the camera and configured to at least facilitate:
   identifying a radial gradient of pixels in a region of interest from the camera data;
   calculating a size of the radial gradient from the camera data by calculating a number of pixels in the radial gradient from the camera data;
   calculating a density of the radial gradient from the camera data by calculating a difference between a maximum shade and a minimum shade in the radial gradient from the camera data; and
   automatically controlling the auto high beam functionality for the headlights based on the radial gradient by automatically reducing an intensity of the headlights based on both the number of pixels and the difference between the maximum shade and the minimum shade in the radial gradient from the camera data.

10. The vehicle of claim 9, wherein the processor is further configured to at least facilitate:
    automatically reducing the intensity of the headlights when the number of pixels in the radial gradient exceeds a predetermined threshold.

11. The vehicle of claim 9, wherein the processor is further configured to at least facilitate:

automatically reducing an intensity of the headlights if the difference between the maximum shade and the minimum shade in the radial gradient exceeds a predetermined threshold.

* * * * *